US007357463B2

United States Patent
Barberis et al.

(10) Patent No.: US 7,357,463 B2
(45) Date of Patent: Apr. 15, 2008

(54) ELECTRO-PNEUMATIC BRAKING CONTROL UNIT FOR A RAILWAY OR TRAMWAY VEHICLE

(75) Inventors: Dario Barberis, Turin (IT); Roberto Tione, Lauriano (IT); Roberto Correndo, Carmagnola (IT)

(73) Assignee: SAB Wabco S.p.A., Turin (IT)

( * ) Notice: Subject to any disclaimer, the term of this patent is extended or adjusted under 35 U.S.C. 154(b) by 116 days.

(21) Appl. No.: 11/011,103

(22) Filed: Dec. 15, 2004

(65) Prior Publication Data

US 2005/0231026 A1 Oct. 20, 2005

(30) Foreign Application Priority Data

Jun. 17, 2004 (IT) .......................... TO2004A0239

(51) Int. Cl.
*B60T 13/74* (2006.01)

(52) U.S. Cl. ...................... 303/7; 303/15; 303/DIG. 10

(58) Field of Classification Search .................... 303/3, 303/7, 15, 119.3, DIG. 10; 137/884
See application file for complete search history.

(56) References Cited

U.S. PATENT DOCUMENTS

| | | | | |
|---|---|---|---|---|
| 4,598,953 | A * | 7/1986 | Wood et al. | 303/3 |
| 5,988,766 | A * | 11/1999 | McCurdy, Jr. | 303/28 |
| 6,135,574 | A * | 10/2000 | Pettit et al. | 303/15 |
| 6,158,821 | A * | 12/2000 | Kushnir et al. | 303/3 |
| 6,234,191 | B1 * | 5/2001 | Clarke | 137/347 |
| 6,250,723 | B1 | 6/2001 | Barberis et al. | |
| 6,457,782 | B1 * | 10/2002 | Truglio et al. | 303/7 |
| 6,883,874 | B2 * | 4/2005 | McCurdy et al. | 303/7 |

FOREIGN PATENT DOCUMENTS

| | | |
|---|---|---|
| DE | 101 61 497 A1 | 6/2003 |
| EP | 0 958 980 A2 | 11/1999 |
| EP | 1 319 566 A2 | 6/2003 |
| EP | 1 437 281 A1 | 7/2004 |

* cited by examiner

*Primary Examiner*—Bradley King
(74) *Attorney, Agent, or Firm*—Sughrue Mion, PLLC

(57) ABSTRACT

An electro-pneumatic braking control unit for a railway or tramway vehicle including a multi-layer structure with a plurality of superimposed plates, and in particular, an upper plate carrying and/or integrating a plurality of pneumatic, electro-pneumatic or electric components and having a plurality of connecting through holes and associated coupling channels arranged in its lower face, and a lower plate which has through holes for connection with corresponding apertures and/or coupling channels of the upper plate as well as associated coupling channels arranged in its upper face. The multi-layer structure may further include an intermediate plate having a plurality of connection passages in positions predetermined in dependence on the circuit to be formed.

10 Claims, 12 Drawing Sheets

50
52
51
V
52
51
4
43
50
42
52
51
12a
PR1
EV9
EV10
EV11
EV1
IV
RV
PR2
PT4
EV2
EV5
PT6
PR3
EV6
3
PT5
EVB
PS1
EV3
EV4
EV7
EV8
PS2
PS3
PS4
12a
12
11
PT1
PT2
PT3
10
12a
IV

PR1
EV9
EV10
EV11
PT5
PS1
EV2(EV1)
EV6(EV5)
PT2(PT1)
10
11
12a
12
18
19b
19a
21
20
17
22
12
11
23
10
24
25
RV
26
3
12a 4
30
31
32
33
41
42
43
50
51
52

10
24
23

10b
10
23
24

11
22

12
20
21

BRAKE CYLINDER 1
BRAKE CYLINDER 2
EMERGENCY BRAKE
2
3
S5
S6
S7
EV7
PT3
EV6
PT2
EV3
EV2
PS1
RV
PT5
S1
S2
S3
BRAKING CONTROL DISTRIBUTOR
VEHICLE SUSPENSION
AUXILIARY RESERVOIR
MAIN DUCT

AXLE 1 CYLINDERS
AXLE 2 CYLINDERS
PARKING BRAKE
BRAKING CONTROL DISTRIBUTOR
VEHICLE SUSPENSION
AUXILIARY RESERVOIR
MAIN DUCT
PARKING BRAKE RESERVOIR
S1
S2
S3
S5
S6
S7
EV3
EV7
PT3
EV6
PT2
EV2
PS1
RV
PT5
EVB
2
3

TO THE CLEANING SHOES
AXLE 1 CYLINDERS
AXLE 2 CYLINDERS
PARKING BRAKE
GENERAL DUCT
BRAKE SHOE SUSPENSIONS
BRAKING CONTROL DISTRIBUTOR
VEHICLE SUSPENSION
AUXILIARY RESERVOIR
MAIN DUCT
PARKING BRAKE RESERVOIR
BRAKE SHOE SUSPENSIONS
S1
S2
S3
S4
S5
S6
S7
EV2
EV3
EV6
EV7
EVB
PT2
PT3
PT5
PS1
RV
2
3

ELECTRO-PNEUMATIC BRAKING CONTROL UNIT FOR A RAILWAY OR TRAMWAY VEHICLE

BACKGROUND OF THE INVENTION

The present invention relates to an electro-pneumatic braking control unit for a railway or tramway vehicle.

More specifically the invention relates to an electro-pneumatic control unit for a railway vehicle or a tram provided with a braking system comprising (among other things) at least one main pneumatic duct, pneumatic actuator devices for the service brake and the safety brake, at least one auxiliary reservoir connected to the said main duct and able to provide compressed air to the said actuators for braking, and control and command means therefore.

Electro-pneumatic units of this type are described for example in U.S. Pat. No. 6,250,723 in the name of the same applicant.

SUMMARY OF THE INVENTION

One object of the present invention is to provide a pneumatic braking command and control unit which has an easily mountable and demountable structure so as to permit easy and rapid access to be gained to its electrical, pneumatic, electro-pneumatic or electronic components, for example during maintenance operations.

A further object of the present invention is to provide such an electro-pneumatic braking control unit, the salient characteristics of which are defined in the annexed claims.

DETAILED DESCRIPTION OF THE INVENTION

Further characteristics and advantages of the invention will become apparent from the following detailed description, given by way of non-limitative example, with reference to the attached drawings, in which.

DETAILED DESCRIPTION OF THE INVENTION

Figure 1:
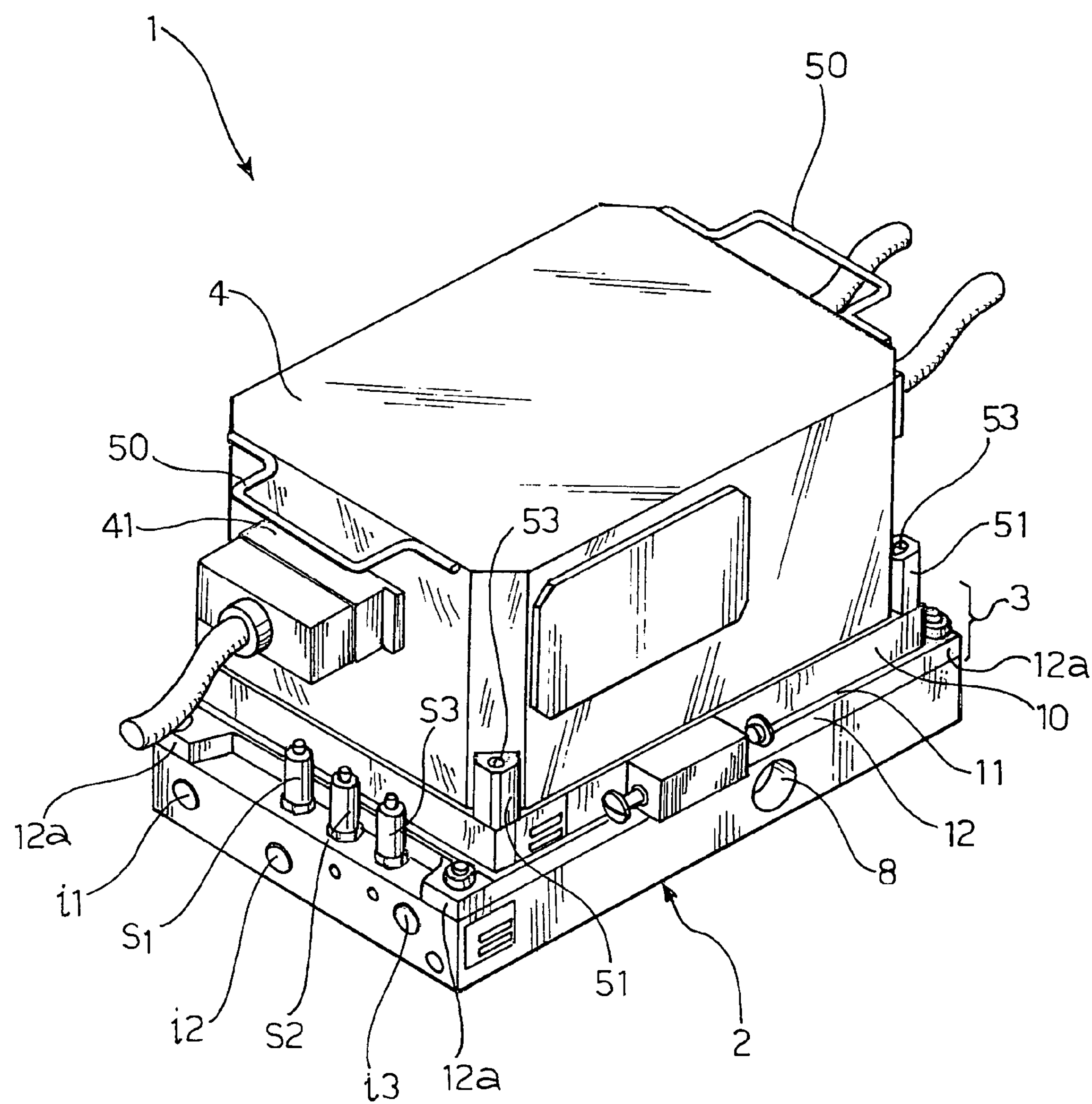
FIG. 1 is a perspective view of an electro-pneumatic unit according to the present invention.
Figure 2:
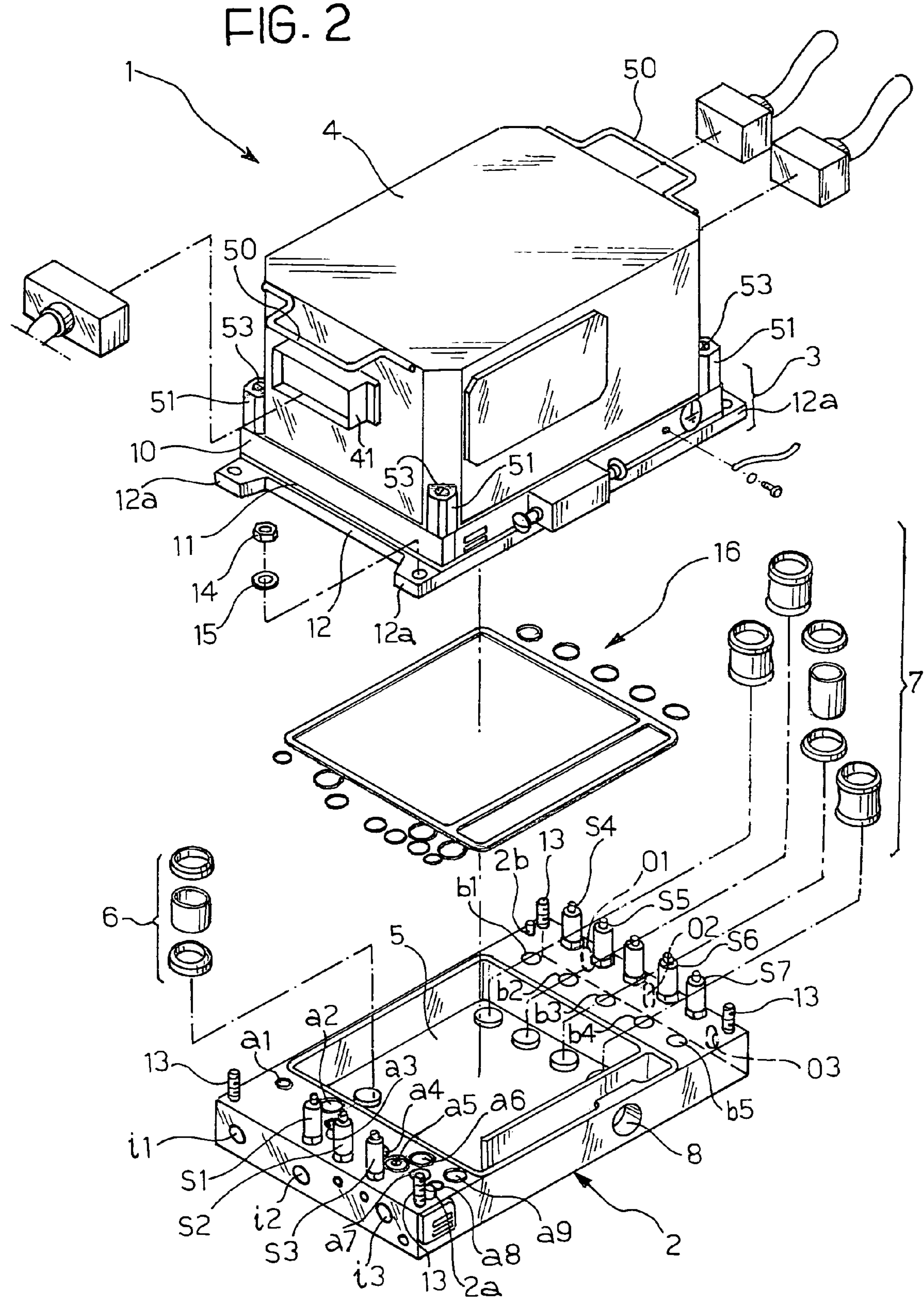
FIG. 2 is a partially exploded perspective view of the electro-pneumatic unit of FIG. 1.

In FIGS. 1 and 2 an electro-pneumatic brake control unit according to the invention, for a railway or tram vehicle, is generally indicated 1.

In the exemplary embodiment illustrated the electro-pneumatic unit 1 comprises a support base and pneumatic interface 2 of substantially rectangular shape.

On the base 2 is a multi-layer intermediate structure generally indicated 3 in FIGS. from 1 to 4.

The intermediate structure 3 is in turn surmounted by an upper container 4 essentially in the form of an inverted basin.

The support base and pneumatic interface 2 has a plurality of inlet openings i1, i2 and i3, on its two opposite sides, and a plurality of output openings o1, o2 and o3 respectively (FIG. 2).

The inlet openings i1, i2 and i3 are intended to be connected, respectively, to a main pneumatic braking supply duct, a general braking duct (for example through a brake control distributor), and an auxiliary reservoir.

The outlet openings o1, o2 and o3 are intended to be connected to brake cylinders associated with the wheels of one or more carriages of the vehicle, to actuators for the stationary parking brake, and possibly to further actuators, such as those associated with the so-called cleaning shoes, and possibly to yet others.

The inlet and outlet openings of the support base and pneumatic interface 2 are connected to connection apertures formed in the upper face of the base 2 by means of connections within this base. In FIG. 2 some of these connection apertures have been indicated a1-a9, and other connection apertures have been indicated b1-b5.

In the intermediate part of the support base 2 is formed a recess or cavity 5 in which are housed silencers 6 and 7 for the discharge outlets to atmosphere of the various valves and solenoid valves incorporated in and/or carried by the multi-layer intermediate structure 3 as will be described in more detail hereinafter (FIG. 2).

On one side the support base 2 further has an exhaust aperture indicated 8 in FIG. 2.

In the exemplary embodiment illustrated the multi-layer intermediate structure 3 essentially comprises an upper plate 10, an intermediate plate 11 and a lower plate 12 clamped together by means of screws not illustrated.

The lower plate 12 has longitudinally projecting appendices 12*a* at its corners and is provided with respective holes through which pass threaded rods 13 which extend from the upper face of the support base 2. Fixing of the multi-layer intermediate structure 3 to the support base 2 is conveniently achieved by means of the said threaded rods 13 and corresponding nuts and washers coupled to them, such as those indicated 14 and 15 in FIG. 2. As is shown in the Figure, between the intermediate structure 3 and the base 2 is interposed a plurality of shaped seals generally indicated 16.

Moreover, at its top the base 2 has at least one pair of reference pins 2*a* and 2*b* intended to engage in corresponding seats provided in the intermediate structure 3 for the purpose of ensuring correct relative positioning and perfect pneumatic seal.

Figure 6:
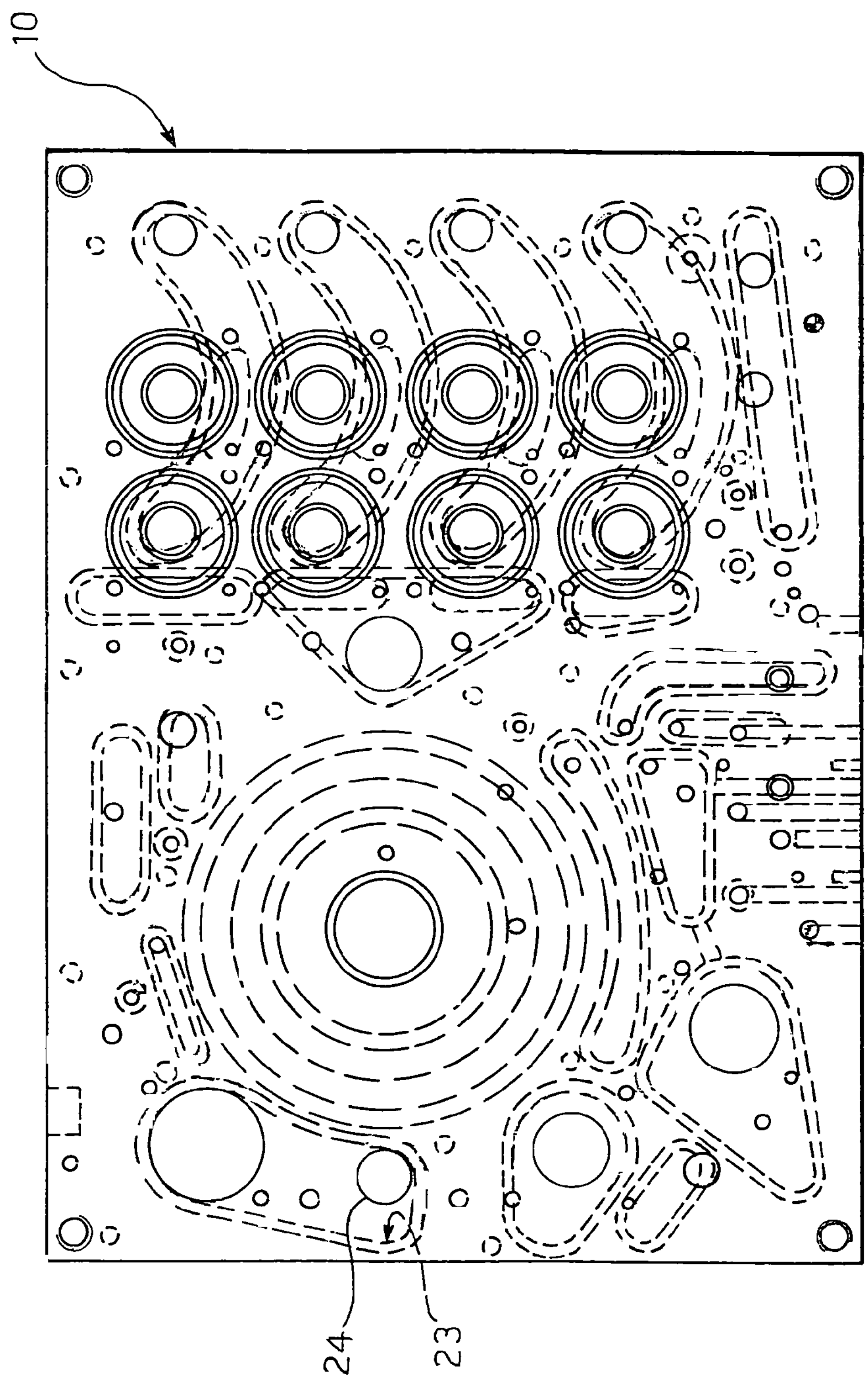
FIG. 6 is a plan view from above of an upper plate of an intermediate structure of an electro-pneumatic unit according to the present invention.
Figure 7:
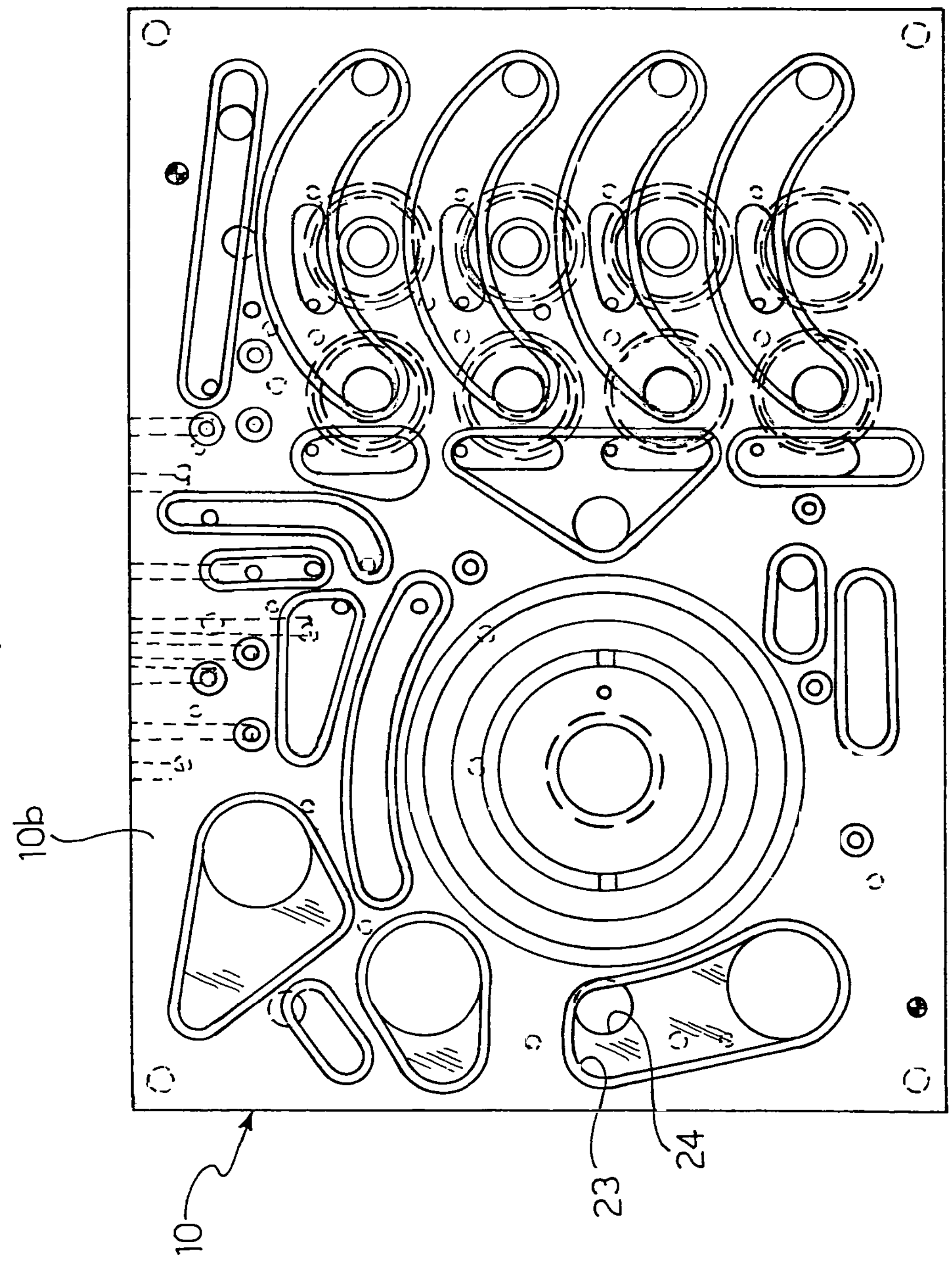
FIG. 7 is a plan view from below of the plate shown in FIG. 6.

The upper plate 10 of the intermediate structure 3 is shown, in an exemplary embodiment, in FIGS. 6 and 7, which illustrate respectively the upper and lower faces thereof.

Figure 3:
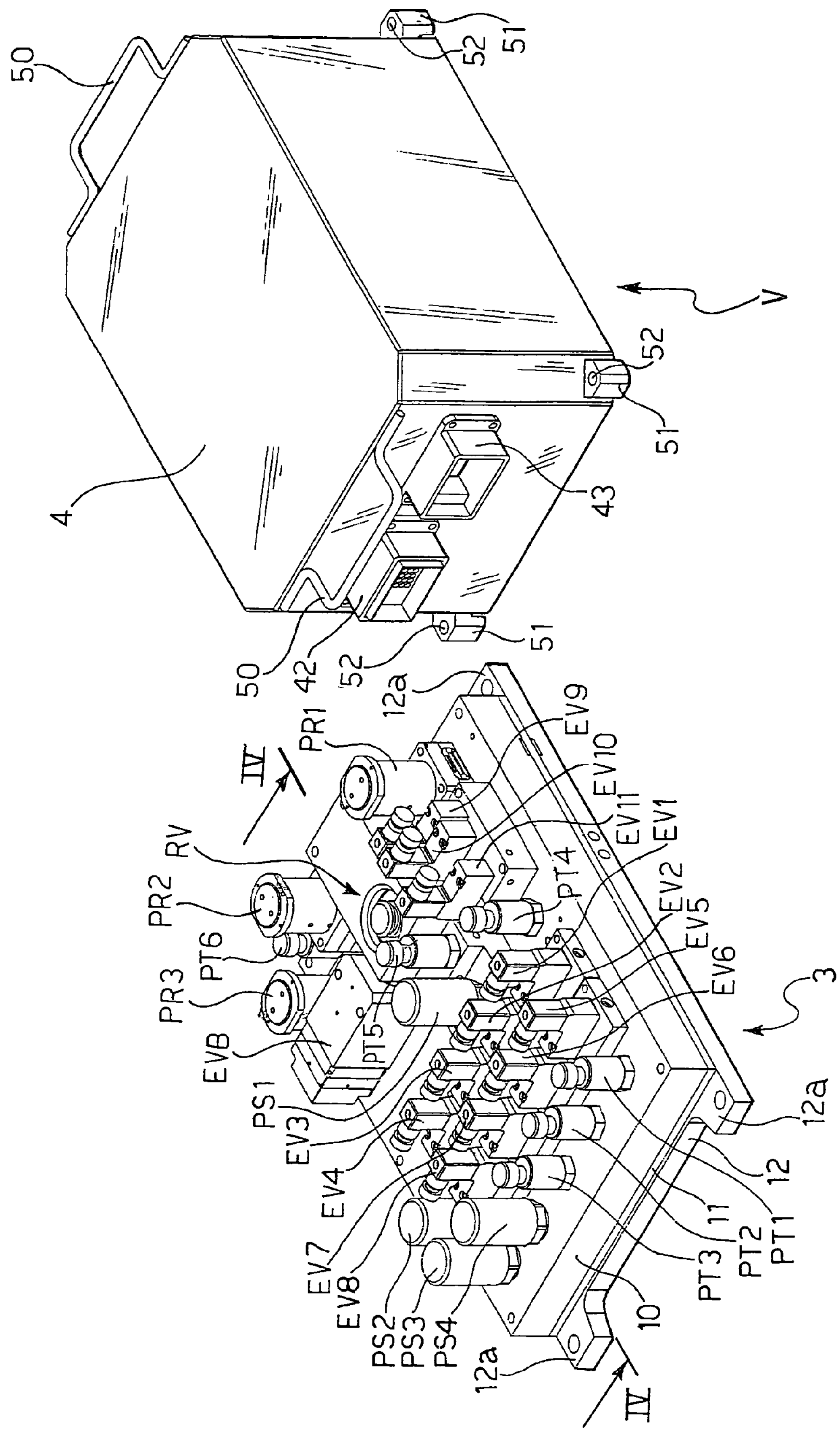
FIG. 3 is a partly exploded partial perspective view of the electro-pneumatic unit of the preceding Figures.
Figure 4:
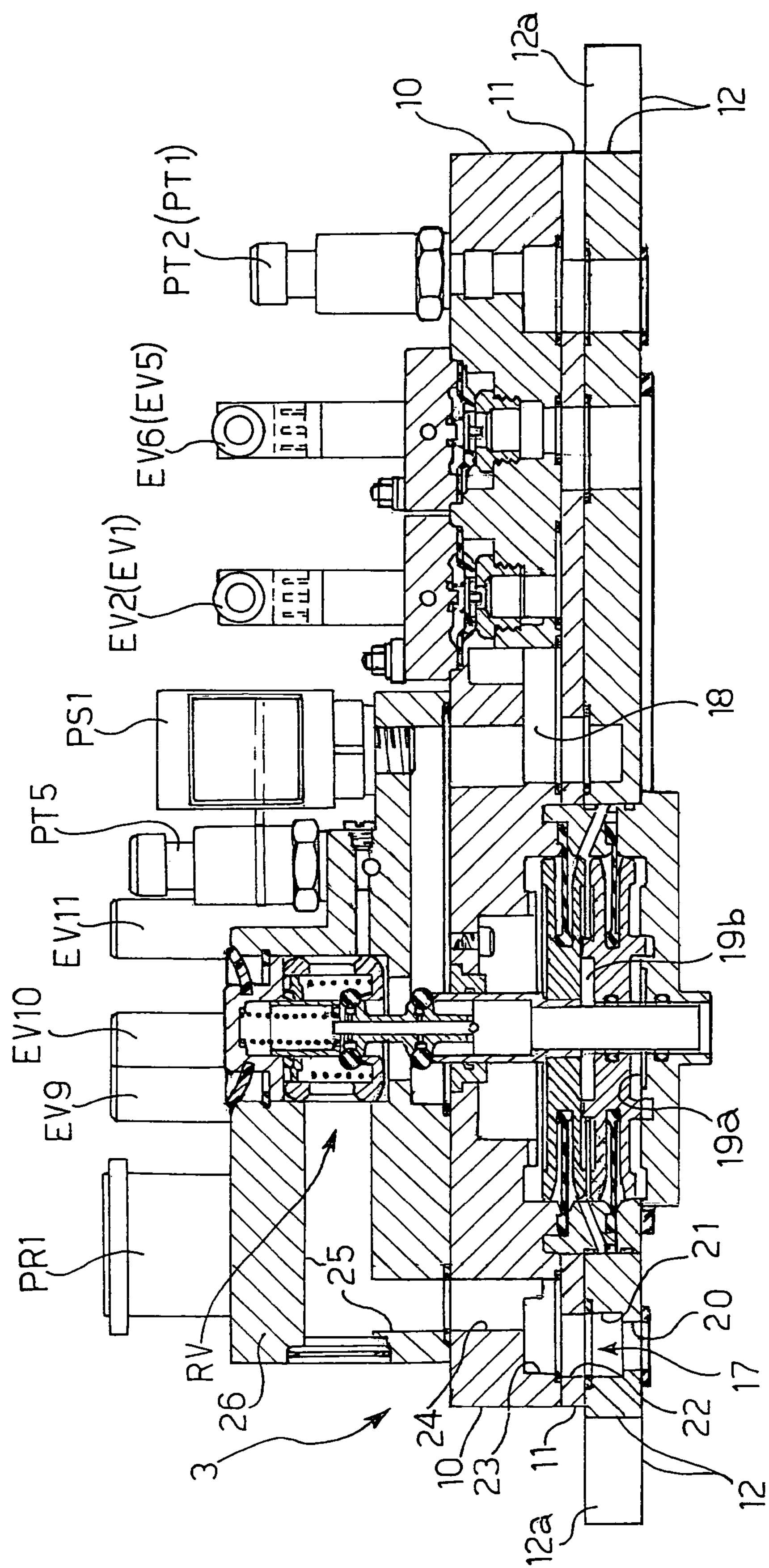
FIG. 4 is a view sectioned essentially along the line IV-IV of FIG. 3.

With reference in particular to FIGS. 3 and 4, the upper plate 10 of the structure 3 carries a plurality of pneumatic, electro-pneumatic and electrical components. In the exemplary embodiment illustrated these components comprise eleven solenoid valves EV1-EV11, a monostable or bistable valve EVB, three pressure regulators PR1, PR2, PR3, four pressure stabilisers PS1-PS4, and six electric pressure transducers PT1-PT6. Of these latter, one may be conveniently utilised as a safety transducer to provide pressure decoupling information in relation to the parking brake.

As can be seen better in FIG. 4, in the multi-layer intermediate structure 3 is integrated a pneumatic relay valve, of type known per se, generally indicated RV. In the embodiment illustrated this comprises a relay valve with an inlet 17 for the brake pressure, an outlet 18 for the brake pressure intended for the brake cylinders associated with the vehicle wheels, and a plurality of piloting or control chambers, indicated 19*a* and 19*b* in FIG. 4.

Figure 9:
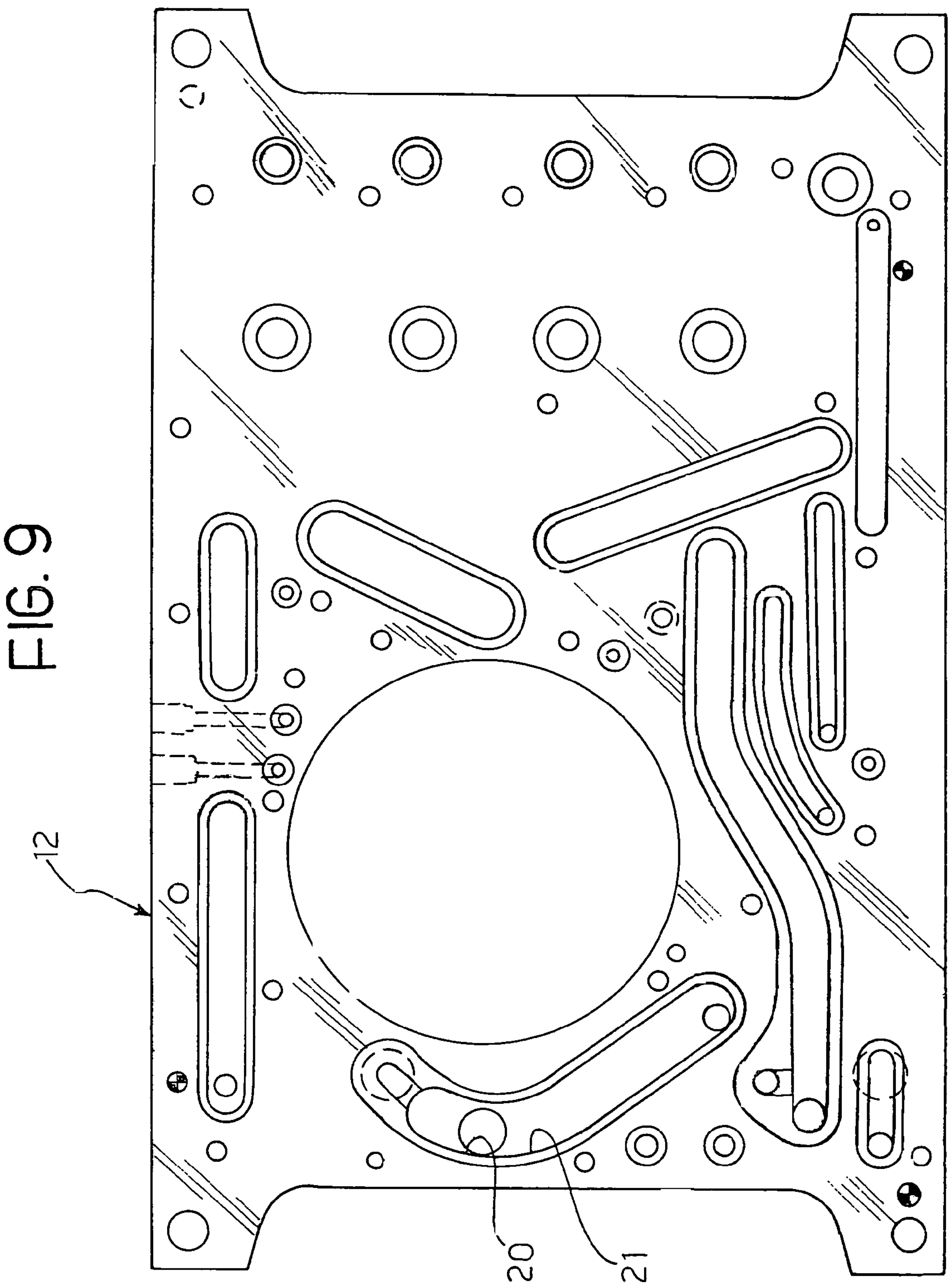
FIG. 9 is a plan view from above of a lower plate of the intermediate structure of an electro-pneumatic unit according to the present invention; and FIGS. from 10 to 12 are electro-pneumatic diagrams which show different pneumatic brake control circuits which can be achieved using an electro-pneumatic unit according to the present invention.
Figure 10:
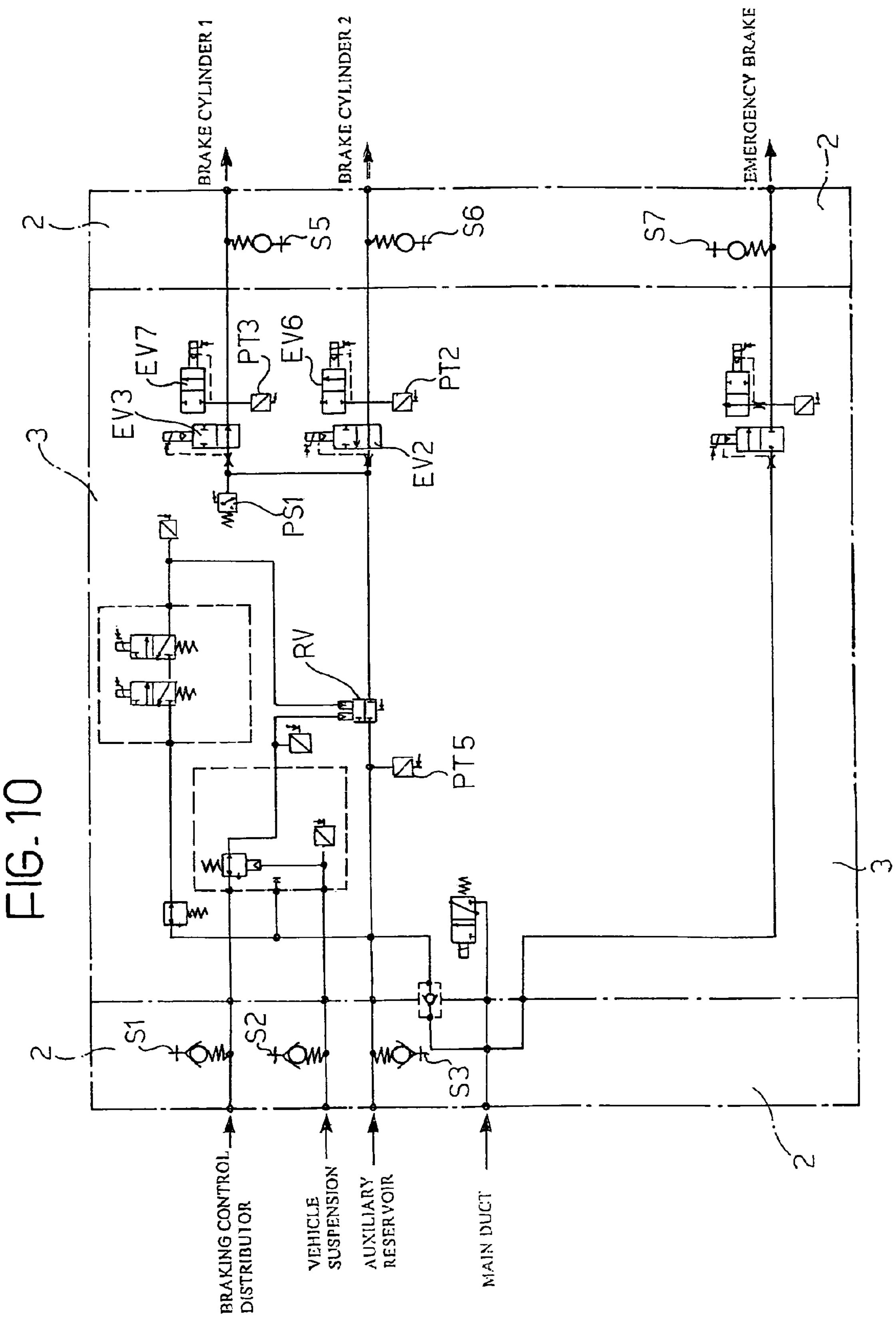
Figure 11:
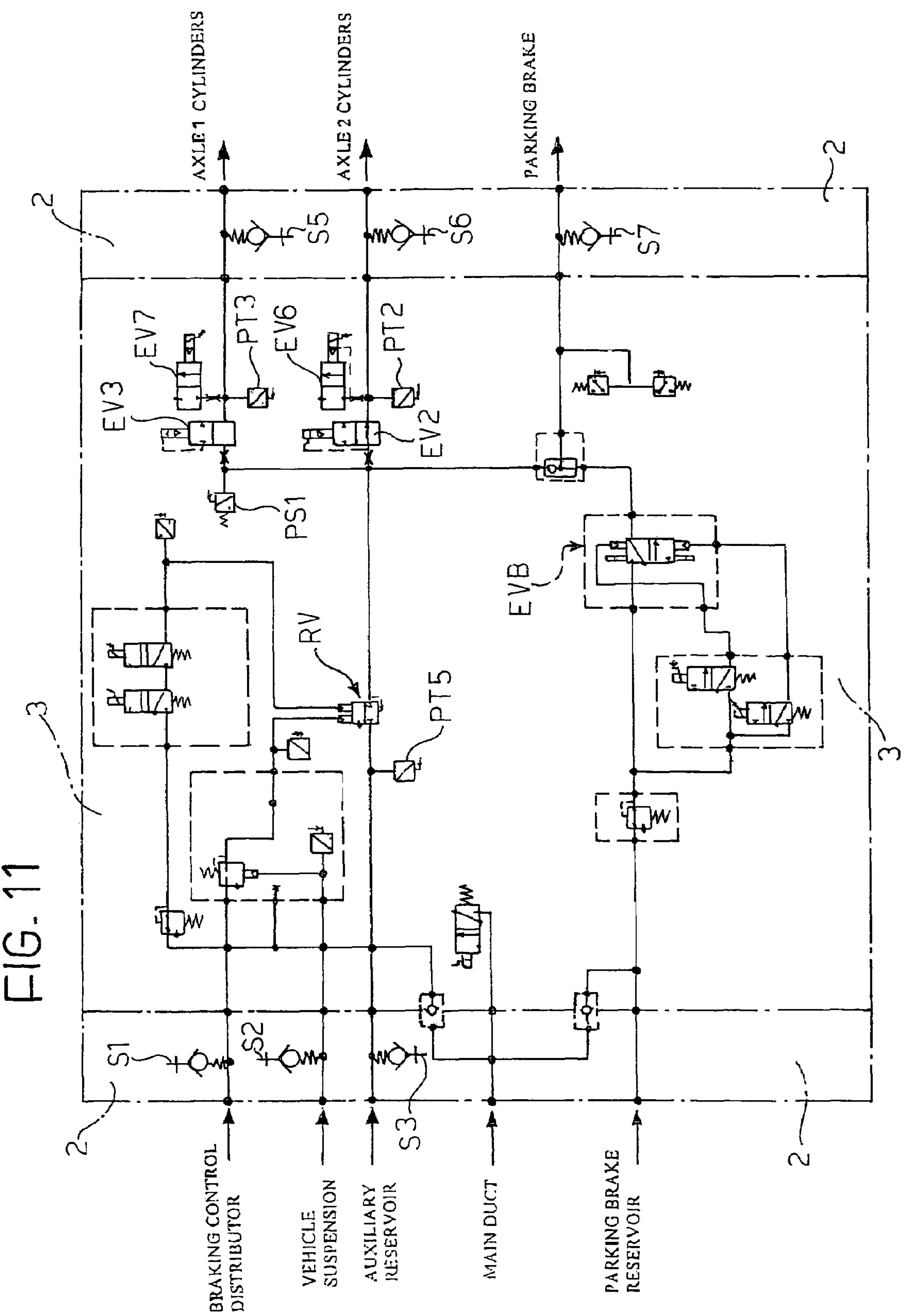
Figure 12:
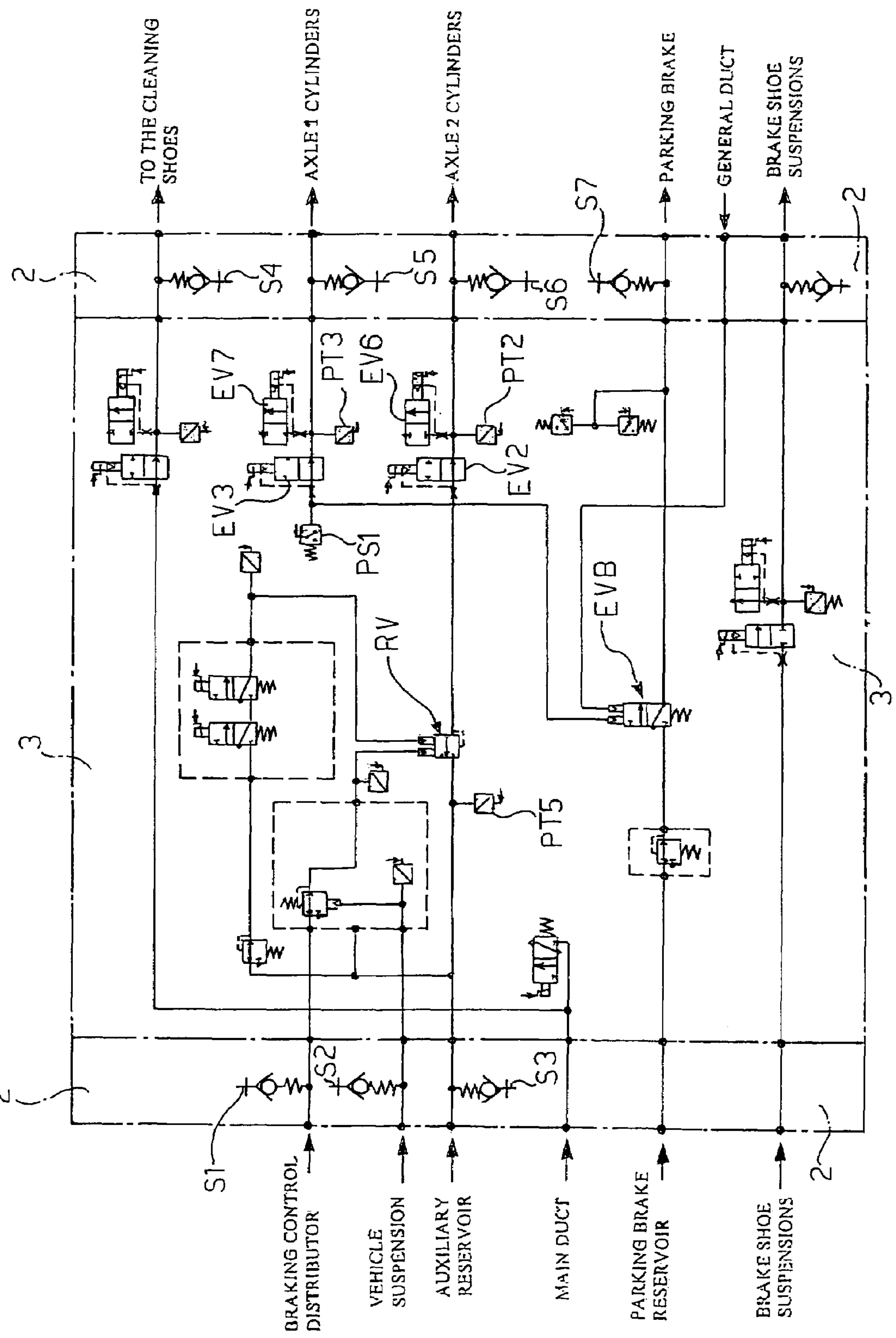

As can be seen from FIG. 4, the inlet ducts 17 and the outlet ducts 18 of the relay valve RV are formed by through holes formed in the plates 10, 11 and 12, and coupling channels formed in the lower face 10*b* (FIG. 7) of the upper plate 10 and in the upper face of the lower plate 12 (FIG. 9).

Figure 8:
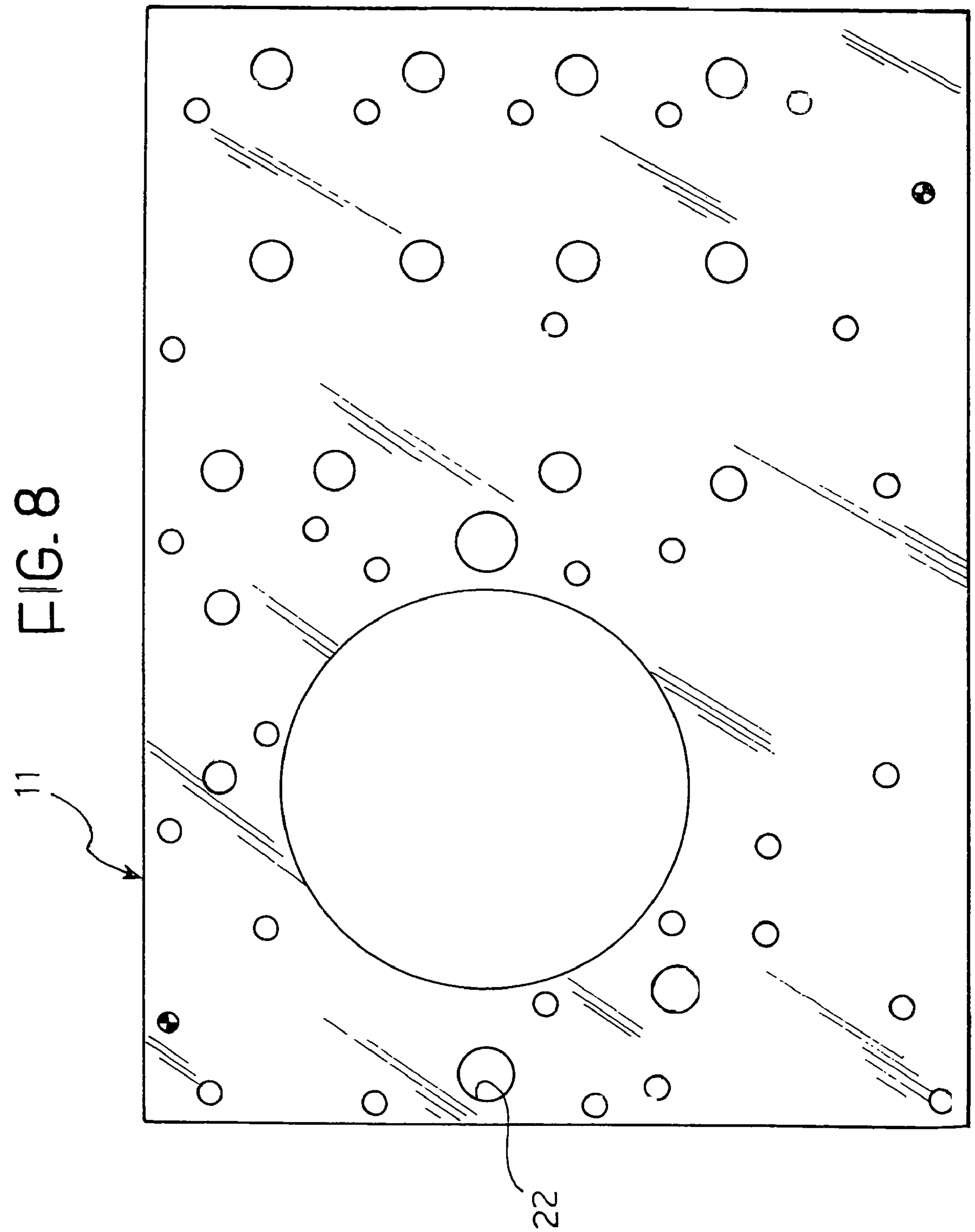
FIG. 8 is a plan view of an intermediate plate.

By way of example the inlet duct 17 of the relay valve RV comprises a through hole 20 (FIGS. 4 and 9) which is formed in the lower plate 12 and opens into a coupling channel 21 formed in the upper face of this plate 12 and which communicates with the through hole 22 formed in the intermediate plate 11 (FIGS. 4 and 8). The aperture 22 in turn communicates with a channel 23 formed in the lower face of the plate 10 (FIGS. 4 and 7) into which opens a through hole 24 of the plate 10.

With reference to FIG. 4, the upper end of the through hole 24 communicates with an L-shape duct 25 having a split form, which extends first vertically and then horizontally, in a body 26 fixed to the upper plate 10 of the intermediate structure 3 and converging to define the relay valve RV.

The plates 10, 11, 12 have a plurality of further apertures and coupling channels, which will not be described in detail but which, as a man skilled in the art will readily be able to appreciate, makes it possible to form connections between the pneumatic and electro-pneumatic components carried by the upper plate 10 and between these and the relay valve RV so as to form a predetermined pneumatic circuit, for example, one of the circuits shown in FIGS. from 10 to 12.

In these Figures at least some of the components shown here have been identified with the same alphanumeric symbols utilised in FIGS. 1 to 4.

Conveniently, the intermediate board 11 of the structure 3 can have a different number of piercings in different positions for the purpose of achieving different modes of interconnection between the pneumatic and electro-pneumatic devices carried by the plate 10, to form different pneumatic circuits. For this reason the intermediate plate 11 can be defined as a "personalisation plate".

Figure 5:
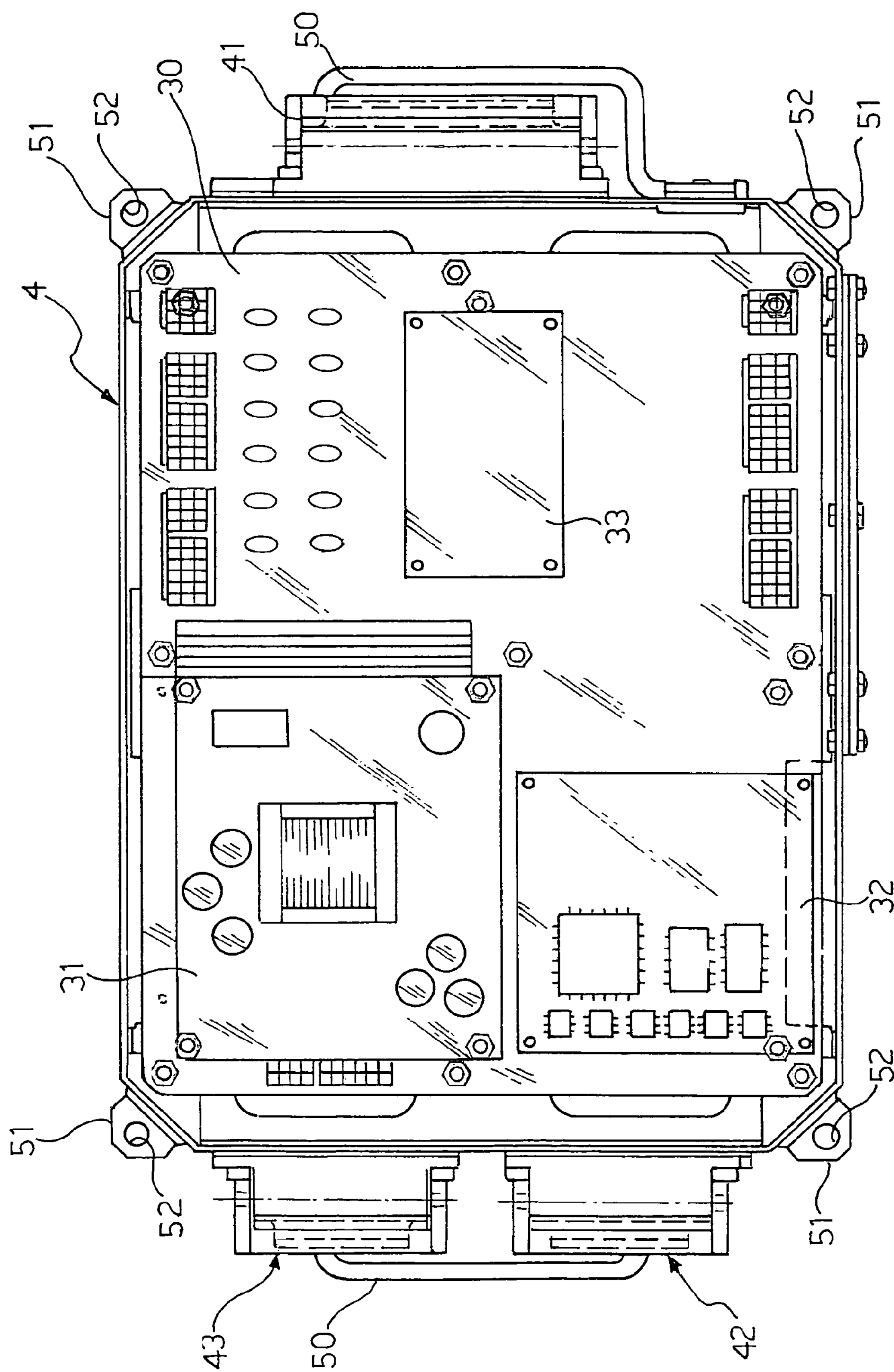
FIG. 5 is a plan view from below of a part of the electro-pneumatic unit of FIG. 3, seen in the direction of the arrow V of this Figure.

The electro-pneumatic unit 1 further includes, as mentioned above, an upper container 4 in the form of an inverted basin. As is seen in FIG. 5, within this container are housed various circuit devices carried by a plurality of cards or boards. In the exemplary embodiment shown in FIG. 5 there is provided a main board 30 to which is connected a further board 31 carrying supply circuits, a board 32 carrying processor circuit components, for example a microprocessor, and a further board 33 carrying the communication circuit components.

In an alternative arrangement, not illustrated, the circuit devices housed within the container 4 may comprise a main card or motherboard, and a further plurality of cards or boards interconnected together and connected to the motherboard by means of so-called flexible flat cables or flexible printed circuits.

At least one circuit board housed in the container 4 may carry electrical pressure transducers coupled to pressure reading points arranged in the intermediate structure 3, for example by means of nipples.

Moreover, at least one card can be provided with electrical connectors coupled to corresponding electrical or electro-pneumatic terminals of the devices carried by the intermediate structure 3.

On its two opposite outer end faces the container 4 has multipolar electric connectors 41, 42, 43 (FIGS. from 1 to 3 and 5) through which the circuit devices contained within it can be connected to a communications network of the railway vehicle on which the electro-pneumatic unit 1 is installed.

To the end faces of the container 4 on which the above-cited connectors are carried, are further connected respective handles 50 able to allow the electro-pneumatic unit 1 as a whole to be carried easily.

At the corners of its free or open face the container 4 has projecting appendices 51 provided with through holes 52 for the passage of fixing screws 53 (FIGS. 1 and 2) which allow the connection thereof to the upper plate 10 of the multi-layer intermediate structure 3. This connection is easily undone when it is necessary to gain access to the circuit devices housed within the said container.

With reference to FIGS. 1 and 2, in the end portions of the support base 2 which are left exposed by the multi-layer structure 3 there is provided a plurality of pressure measurement points indicated S1-S7, each of which comprises for example a non-return valve.

The electro-pneumatic unit according to the invention can be assembled and dismantled in an extremely easy manner. This is particularly favourable in that it allows access to be gained in a rapid and easy manner for possible maintenance operations and/or component replacements.

The particular multi-layer intermediate structure of the electro-pneumatic unit makes it possible to reduce the complexity and size of the interconnections between the pneumatic and electro-pneumatic devices. This also improves the performance and reliability of the unit.

The upper container of the electro-pneumatic unit, if made of a suitable metal, may conveniently act as a screen able to limit electromagnetic emissions towards the outside and protects the interior from disturbances. This upper container, which acts virtually as a cover, surrounds and encloses all the electrical and electronic components and the pneumatic and electro-pneumatic components, and protects them in all senses, that is to say also from dust and other external agents. Moreover it advantageously allows limitation of the escape of flames, fumes, and noxious gases in the case of a fire in components within it.

The support base 2 of the electro-pneumatic unit may in use be fixed to the supporting structure of a railway or tram vehicle, possibly with the interposition of suspension means, for the purpose of reducing the effect of vibrations.

The unit 1 may in particular be fixed to a supporting panel to which is further fixed a pneumatic control device such as, for example, a safety valve or distributor.

Naturally, the principle of the invention remaining the same, the embodiments and details of construction can be widely varied with respect to what has been described and illustrated purely by way of non-limitative example, without by this departing from the ambit of the invention as defined in the annexed claims.

What is claimed is:

1. An electro-pneumatic brake control unit for a railway or tram vehicle having multi-layer structure comprising:

an upper plate including a plurality of pneumatic, electro-pneumatic or electric components and having a plurality of connection through holes and associated coupling channels provided in its lower face;

a lower plate having through holes for connection with corresponding apertures and/or coupling channels of the upper plate, and having associated coupling channels arranged in its upper face; and an intermediate plate having a plurality of connection passages in positions predetermined as a function of a pneumatic circuit to be formed, wherein a pneumatic relay valve is integrated in said structure, said relay valve extending through said structure and comprising control chambers formed inside said structure and inlet and outlet ducts which include holes and coupling channels formed in said plates.

2. An electro-pneumatic unit according to claim 1, wherein said structure carries and/or integrates a plurality of solenoid valves, as well as pressure switches and pressure regulators.

3. An electro-pneumatic unit according to claim 2, wherein said structure further carries at least one monostable or bistable pneumatic valve usable for control of parking brake actuators.

4. An electro-pneumatic unit according to claim 1, further comprising:

a support base and pneumatic interface having a plurality of inlet openings intended to be connected to at least one main brake duct and to pressure accumulator means, and a plurality of outlet openings intended to be connected to pneumatic brake devices; the said inlet and outlet openings being connected to connection apertures formed in the upper face of the said base by mean of connections within the base;

said multi-layer structure being fixed in a demountable manner to the support base and forming passages and/or connection ducts between the said components and between at least some of these and the upper connection apertures of the said support base; and a container in the form of an inverted basin fixed in a removable manner to the multi-layer structure, and in which are housed supply, processing, communication and control circuit means coupled to electro-pneumatic or electric device of the multi-layer structure; said container having electrical connection means able to allow connection of the said circuit means to a supply, communication and control network of the vehicle.

5. An electro-pneumatic unit according to claim 4, wherein the support base and pneumatic interface carries silencer means for the discharge of pneumatic or electro-pneumatic components carried by the multi-layer structure.

6. An electro-pneumatic unit according to claim 4, wherein the support base and pneumatic interface carry pressure measurement points associated with connections within the said base.

7. An electro-pneumatic unit according to claim 4, wherein the said container is of metal material able to provide protection from electromagnetic disturbances, and from atmospheric and/or environmental agents.

8. An electro-pneumatic unit according to claim 4, wherein the multi-layer structure has a plurality of test points for measurement of the pneumatic pressure, and the said circuit means carried by the container include electrical pressure transducers coupled to the said test points to effect coupling of the said container to the multi-layer structure.

9. An electro-pneumatic unit according to claim 4, wherein the said circuit means carried by the container include electrical connectors coupled with corresponding terminals of electrical or electro-pneumatic devices of the intermediate structure by the action of coupling the said container to the multi-layer structure.

10. An electro-pneumatic unit according to claim 4, wherein the base and the said container are connected to the intermediate structure via respective fixing devices independent of one another, in such a way that the base and the container are individually dismantlable and separable from the multi-layer structure.

* * * * *

UNITED STATES PATENT AND TRADEMARK OFFICE

CERTIFICATE OF CORRECTION

PATENT NO. : 7,357,463 B2
APPLICATION NO. : 11/011103
DATED : April 15, 2008
INVENTOR(S) : Dario Barberis, Roberto Tione and Roberto Correndo It is certified that error appears in the above-identified patent and that said Letters Patent is hereby corrected as shown below:

On the Title Page
(30) Foreign Application Priority Data
Change "June 17, 2004" to --April 20, 2004--.

Signed and Sealed this

Eleventh Day of November, 2008

JON W. DUDAS
*Director of the United States Patent and Trademark Office*